Feb. 10, 1931. N. LAMOUREUX ET AL 1,791,529
FISHING TOOL
Filed Aug. 12, 1929
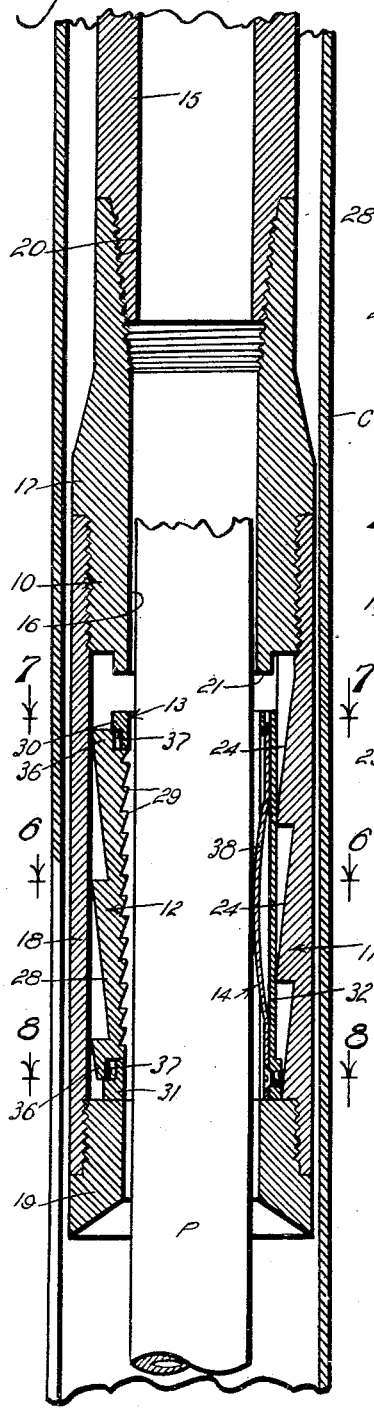
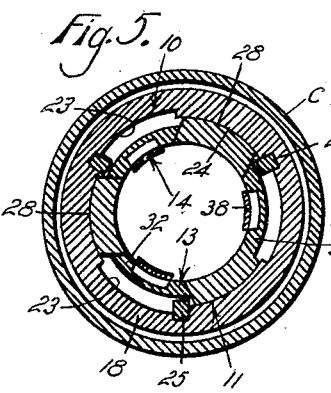
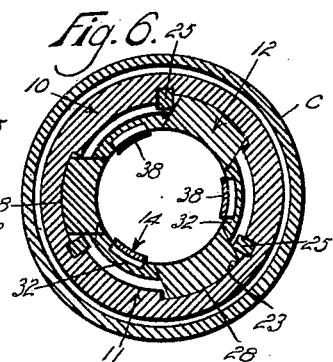
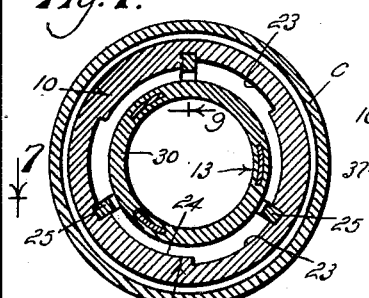
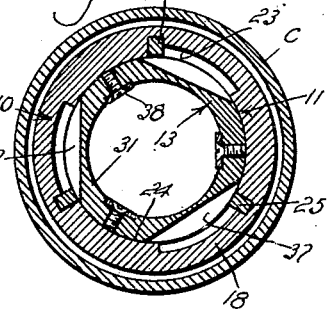
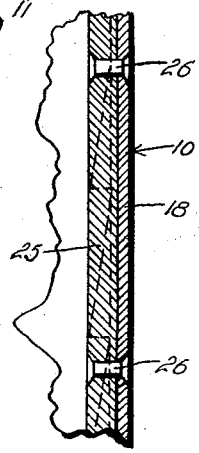
Inventors
Nelson Lamoureux
and Michael W. Lukes
Their Attorney Patented Feb. 10, 1931

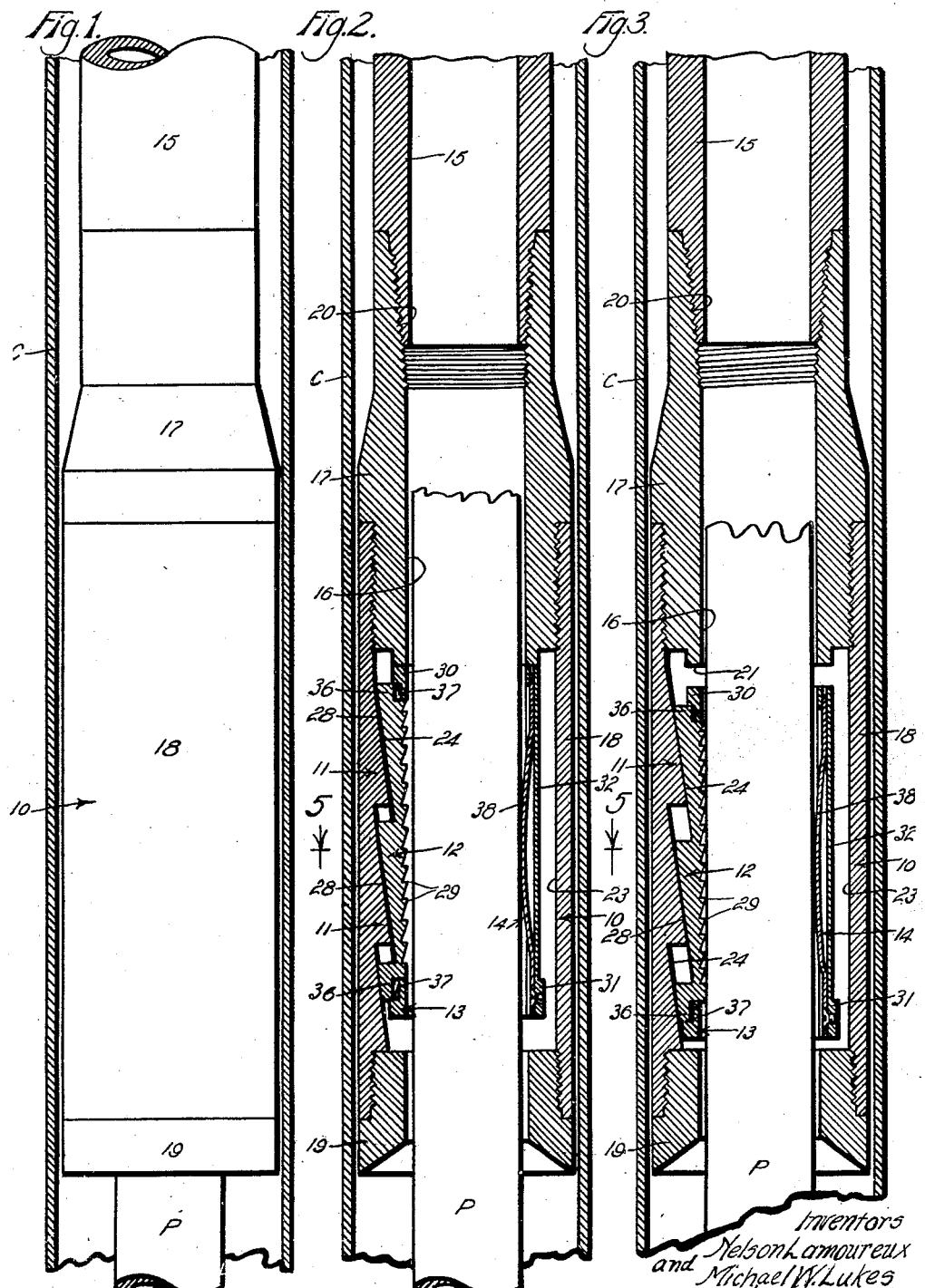

1,791,529

UNITED STATES PATENT OFFICE

NELSON LAMOUREUX, OF WHITTIER, AND MICHAEL W. LUKES, OF COMPTON, CALIFORNIA

FISHING TOOL

Application filed August 12, 1929. Serial No. 385,236.

This invention relates to a well tool and relates more particularly to a fishing tool. It is a general object of the invention to provide a fishing tool, of the type known as a socket, that is effective in gripping parts lost in a well and which can be released when desired.

Fishing tools of the socket type are used to fish tools, drill pipe, etc. out of wells. The common types of sockets after gripping the lost part are not releasable, and if the part cannot be moved or withdrawn from the well, it is often extremely difficult to remove the socket and drill stem carrying the socket.

It is an object of this invention to provide a fishing tool of the socket type that will operate effectively and dependably to grip an object in a well and which can be released from the object whenever desired.

It is another object of the invention to provide a tool of the character mentioned that is of simple, strong construction, and easily operated to engage and release parts within a well bore.

It is an important object of the invention to provide a well tool of the character mentioned that can be used to rotate a lost part as well as lift it.

The various objects and features of our invention will be best and more fully understood from the following detailed description of a typical form and application of the invention, through which description reference is had to the accompanying drawings, in which:

Fig. 1 is a view showing the tool provided by this invention extending over a drill pipe located in a well. Fig. 2 is a longitudinal detailed sectional view of the tool showing the parts in position ready to be actuated to grip the drill pipe. Fig. 3 is a view similar to Fig. 2 showing the parts in the actuated or set position in which the tool grips the drill pipe. Fig. 4 is a view similar to Fig. 2 showing the parts in the released position in which the tool is free of the pipe. Fig. 5 is a detailed sectional view taken as indicated by line 5—5 on Fig. 2. Fig. 6 is a transverse detailed sectional view taken as indicated by line 6—6 on Fig. 4. Fig. 7 is a detailed sectional view taken as indicated by line 7—7 on Fig. 4. Fig. 8 is a detailed transverse sectional view taken as indicated by line 8—8 on Fig. 4, and Fig. 9 is an enlarged vertical sectional view taken as indicated by line 9—9 on Fig. 7.

The tool provided by our invention includes, generally, a body 10, tapered or wedge parts 11 on the body, slips 12 adapted to cooperate with the wedge parts 11, a carrier or cage 13 for the slips, and means 14 on the cage to frictionally engage a lost part within a well bore; for example, a part such as a section of drill pipe P.

The body 10 is an elongate tubular member carrying the other parts of the tool and is adapted to be attached to an operating member such as a string of drill pipe, or the like, to be operated in a well bore. In the drawings we have illustrated the body 10 disposed within a casing C and carried by a drill stem 15. The body 10 is provided with a central longitudinal opening 16 which carries the various other parts of the device, and may be of sectional formation. In the case illustrated, the body includes an upper section 17, a central or main section 18, and a lower section 19. The upper section 17 may be provided at its upper end with a threaded socket 20 to facilitate its attachment to the drill stem 15. The main section 18 may be attached to the upper section 17 in any desired manner. In the particular form of the invention illustrated the main section 18 is screw threaded onto the upper section and the parts are related so that the two sections have the same exterior diameter at their points of connection, while the interior of the upper section 17 is somewhat smaller in diameter than the main section so that its lower end presents a downwardly facing shoulder 21 in the opening 16. The exterior of the main section 18 is preferably of the same diameter throughout its length so that the tool may be readily operated in the casing C.

The lower section 19 is provided to guide parts into the opening 16, and is in the form of a sleeve screw threaded to the lower end of the main section. The exterior of the section 19 is preferably flush with the exterior of the main section 18. The portion of the opening 16 through the section 19 is somewhat smaller than the opening 16 through the main section so that the upper end of the section 19 extends into the opening. The lower end of the section 19 is beveled inwardly to the opening 16 to guide lost parts into the body 10.

The beveled or wedge parts 11 are formed on the inner wall of the main part 18 of the body and are spaced apart circumferentially so that there are grooves 23 between them. The wedge parts 11 extend longitudinally of the section 18 and preferably have stepped wedge faces 24 to cooperate with the slips 12. The wedge parts may be formed integral with the body, and the faces 24 incline downwardly and inwardly. A vertical stop 25 is provided along one edge of each wedge part 11. The stops 25 are arranged along the corresponding edges of the parts 11 so that the slips 12 can be moved laterally off the wedge parts into the grooves 23 by rotative movement in only one direction. The stops 25 may seat into vertical recesses in the inner wall of the section 18 and may be attached to the section by any suitable means. We have shown rivets 26, for this purpose.

The slips 12 are shiftably carried by the cage 13 to cooperate with the wedge parts 11 to be operated inwardly to grip a drill pipe P, or the like. There is preferably one slip 12 to cooperate with each wedge part 11. The outer sides of the slips 12 have stepped tapered faces 28 to cooperate with the faces 24. The faces 28 are pitched or inclined upwardly and outwardly at the same inclination as the faces 24 of the wedge parts so that the faces 24 and 28 engage each other effectively. The faces 24 and 28 of the wedge parts 11 and the slips 12 are related so that when they are in engagement and the body 10 is moved upwardly relative to the slips the slips are moved inwardly. The inner sides of the slips 12 are provided with gripping parts in the form of teeth 29 to effectively grip the part P. The inner sides of the slips may be curved as shown in the drawings and the teeth 29 formed so that they are effective in lifting the pipe P when the tool is moved upwardly in the well bore.

The cage 13, which is provided to carry the slips 12, is carried in the opening 16 in the main section 18 of the body. The cage 13 is freely carried within the section 18 and is shiftable between the end 21 of the upper section 17 of the body and the upper end of the lower section 19. The cage 13 includes an upper ring 30, a lower ring 31, and vertical ribs 32 connecting the rings 30 and 31. The slips 12 are carried by the cage so that they are free to shift radially inward and outward. We have provided reduced extensions 36 on each end of each slip to freely fit into recesses 37 in the rings 30 and 31. The extensions 36 and the recesses 37 are related so that the slips 12 are free to move radially between the "in" position in the grooves 23 and the actuated position on the wedge parts 11.

The means 14 is provided to produce frictional engagement between the cage 13 and the pipe P, to resist movement of the cage relative to the pipe P when the tool is being operated. The means 14 may include a plurality of leaf springs 38 carried by the cage and bowed inwardly to engage the pipe P. The springs are preferably arranged in alignment with the ribs 32 and extend between the rings 30 and 31. We have shown the springs 38 fixed to the lower ring 31 and slidably carried in openings in the upper ring 30.

In operation the tool is attached to an operating member such as the drill stem 15 and is lowered into the well. As the tool passes over the upper end of the pipe P, or other part to be removed from the well, the leaf springs 38 engage the pipe causing the cage to be moved to an up position in the body. When the cage is in this position the slips 12 are free of the pipe P. When the part or pipe P is within the body 10 the operating member 15 may be rotated to assure positioning of the slips 12 over the wedge parts 11. To grip the drill pipe the body is pulled up or moved up relative to the cage 13 causing the wedge parts 11 to force the slips 12 inwardly into gripping engagement with the pipe P. Further upward movement of the body 10 will cause the pipe P to be raised or lifted. It will be obvious that when the slips 12 are gripping the pipe P that the operating member 15 may be rotated in one direction to rotate, or turn, the pipe P.

If, after the pipe P has been gripped by the slips 12, it is desired to release the tool from the pipe P, the operating member 15 is rotated in the direction opposite from the direction it was rotated to shift the slips on to the wedge parts 11. This rotation of the tool causes the slips 12 to be moved off of the wedge parts and into the grooves 23 releasing the pipe P. With the slips 12 in this position, the tool may be freely withdrawn from the well. The utility and practicability of the tool provided by this invention will be apparent from the foregoing detailed description. It is to be noted that the tool is of extremely simple construction and is dependable in operation.

Having described only a typical, preferred form of our invention, we do not wish to limit ourselves to the specific details set forth, but wish to reserve to ourselves any changes or variations that may appear to those skilled in the art or fall within the scope of the following claims:

Having described our invention, we claim:

1. A well tool of the character described including, a tubular body, a wedge part on the inner wall of the body, a slip mounted in the body for cooperative movement along the wedge part and for lateral movement off the wedge part.

2. A well tool of the character described including, a tubular body, a wedge part on the inner wall of the body, a slip mounted in the body for cooperative movement longitudinally along the wedge part and for lateral movement off the wedge part, and means preventing lateral movement of the slip in one direction from the wedge part.

3. A well tool of the character described including, a tubular body, a longitudinally extending wedge part on the inner wall of the body, a slip mounted in the body for cooperative movement longitudinally along the wedge part and for lateral movement off the wedge part, and a stop at the wedge part preventing lateral movement of the slip in one direction from the wedge part.

4. A well tool of the character described including, a tubular body, a wedge part on the inner wall of the body, a slip, a cage within the body holding the slip for cooperative longitudinal movement along the wedge part and for lateral movement out of engagement with the wedge part.

5. A well tool of the character described including, a tubular body, a wedge part on the inner wall of the body, a slip, a cage slidable within the body holding the slip for cooperative longitudinal movement along the wedge part and for lateral movement out of engagement with the wedge part.

6. A well tool of the character described including, a tubular body, a wedge part on the inner wall of the body, a slip, a cage within the body holding the slip for cooperative longitudinal movement along the wedge part and for lateral movement out of engagement with the wedge part, the cage including rings freely carrying the ends of the slip, and a rib connecting the rings.

7. A well tool of the character described including, a tubular body, a longitudinally stepped wedge part on the inner wall of the body, a slip mounted in the body for cooperative longitudinal movement along the wedge part and for lateral movement off the wedge part.

8. A well tool of the character described including, a tubular body, a wedge part on the interior of the body, a slip, a carrier holding the slip for cooperative engagement along the wedge part and for lateral movement out of engagement with the wedge part, and means on the carrier adapted to engage an object in a well bore to resist movement of the carrier through the well bore.

9. A well tool of the character described including, a tubular body, a wedge part on the interior of the body, a slip, a carrier holding the slip for cooperative engagement along the wedge part and for lateral movement out of engagement with the wedge part, and leaf springs on the carrier adapted to engage an object in a well bore to resist movement of the carrier through the well bore.

10. A well tool of the character described including, a tubular body, circumferentially spaced wedge parts on the interior of the body, a slip mounted for cooperative longitudinal movement along the wedge parts and for lateral movement into the spaces between the wedge parts.

11. A well tool of the character described including, a tubular body, spaced wedge parts on the interior of the body, slips, and a cage holding the slips for cooperative longitudinal movement along the wedge parts and for lateral movement into the spaces between the wedge parts.

12. A well tool of the character described including, a tubular body, spaced wedge parts on the interior of the body, slips, a cage holding the slips for cooperative longitudinal movement along the wedge parts and for lateral movement into the spaces between the wedge parts, and means on the carrier adapted to engage an object to resist movement of the cage when the body is operated through a well bore.

13. A well tool of the character described including, a tubular body, spaced wedge parts on the interior of the body, slips, a carrier slidable within the body holding the slips for cooperative movement along the wedge parts and for lateral movement in one direction into the spaces between the wedge parts, means for preventing lateral movement of the slips in the opposite direction, and leaf springs on the carrier adapted to engage an object to resist movement of the carrier relative to the body.

In witness that we claim the foregoing we have hereunto subscribed our names this 15th day of July, 1929.

MICHAEL W. LUKES.
NELSON LAMOUREUX.